United States Patent [19]

Hopkins

[11] 4,200,816
[45] Apr. 29, 1980

[54] WHEEL SPEED SENSOR INCLUDING ELECTRO-MAGNETIC PICKUP

[75] Inventor: Gary L. Hopkins, Farmington, Mich.

[73] Assignee: Eaton Corporation, Cleveland, Ohio

[21] Appl. No.: 905,024

[22] Filed: May 11, 1978

[51] Int. Cl.$^2$ .................................................. H02K 19/24
[52] U.S. Cl. ..................................... 310/168; 340/672
[58] Field of Search ................................ 310/168–170, 310/75 R, 154; 322/47; 188/181 R; 324/173, 174; 336/110, 135; 340/672, 195, 196

[56] References Cited

U.S. PATENT DOCUMENTS

| | | | |
|---|---|---|---|
| 3,854,556 | 12/1974 | Gee | 188/181 R |
| 3,917,997 | 11/1975 | Sidor | 324/174 |
| 3,937,994 | 2/1976 | Presley | 310/168 |
| 3,938,112 | 2/1976 | Gee | 188/181 R |
| 3,942,045 | 3/1976 | Palazetti | 324/174 |
| 3,947,711 | 3/1976 | Presley | 310/168 |
| 3,961,215 | 6/1976 | Gee | 310/168 |
| 3,980,913 | 9/1976 | Peterson | 310/168 |
| 3,988,624 | 10/1976 | Urban | 310/168 |
| 4,097,756 | 6/1978 | Gee | 310/168 |

FOREIGN PATENT DOCUMENTS

| | | | |
|---|---|---|---|
| 932426 | 8/1973 | Canada | 310/168 |
| 1374774 | 8/1964 | France | 310/168 |

*Primary Examiner*—R. Skudy

*Attorney, Agent, or Firm*—Blanchard, Flynn, Thiel, Boutell & Tanis

[57] ABSTRACT

A wheel speed sensor including an annular rotor rotatable with a wheel, or the like, has circumferentially distributed surface interruptions. A sensing device fixed against rotation faces the rotor and includes a source of magnetic flux and a coil to generate an electrical signal variable with changes in the magnetic flux through the coil. The sensing device further includes first and second pole members extending from opposite poles of the flux source and spaced so that one pole member opposes a surface interruption on the rotor while the other faces the rotor surface between surface interruptions, and vice versa, to provide a magnetic flux path between the rotating rotor and alternating ones of said first and second pole members. A third pole member extends past the coil and has one end opposing the rotor and wider than the surface interruptions to maintain continuous flux transferring relation with the rotor. The third pole member at its other end is coupled to a coil core extending through the inside diameter of the coil. The coil core is connected to a shunt which in turn is positioned to establish two predetermined air gaps between the first and second pole members respectively. As the rotor rotates, the resulting flux in the coil core alternates in direction as the first and second pole members traverse the rotor spaces alternately.

4 Claims, 8 Drawing Figures

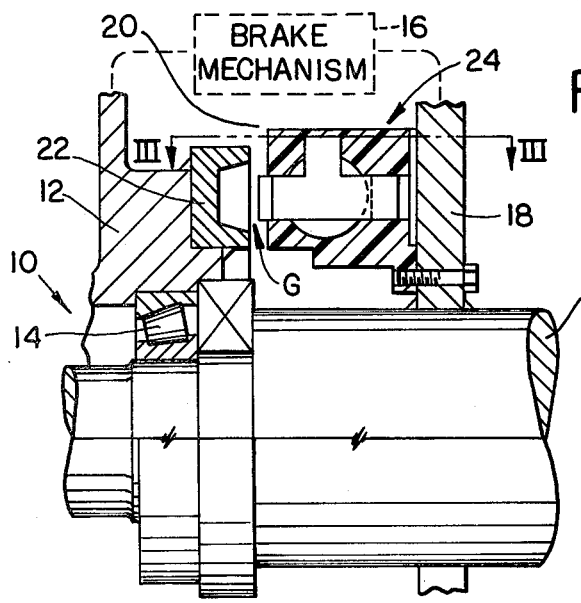
FIG. 1
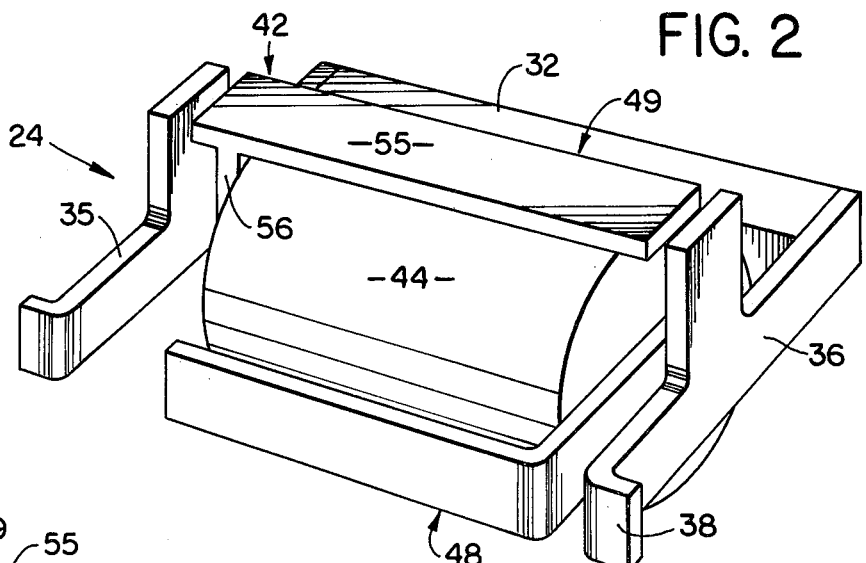
FIG. 2
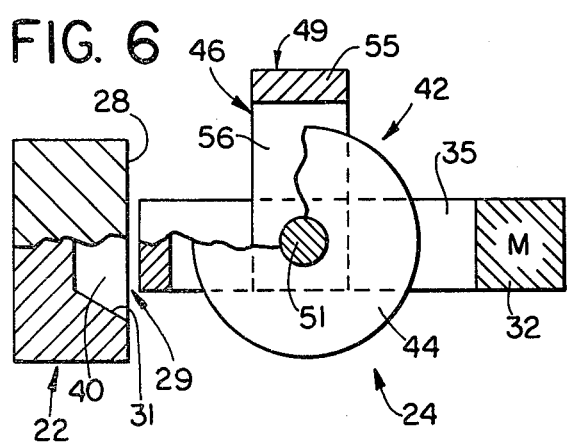
FIG. 6
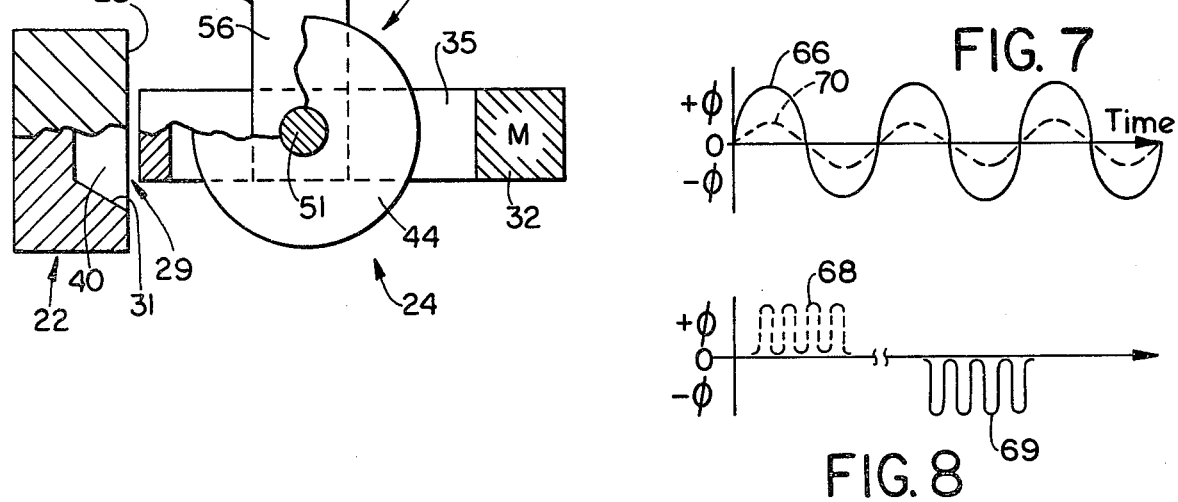
FIG. 7
FIG. 8

WHEEL SPEED SENSOR INCLUDING ELECTRO-MAGNETIC PICKUP

FIELD OF THE INVENTION

This invention relates to improved wheel speed sensor for sensing the angular velocity of a rotating body, such as a vehicle wheel.

BACKGROUND OF THE INVENTION

While the present invention is applicable to a variety of rotation sensing uses, it will for convenience be described in the context of wheel speed sensing in vehicles, and the described embodiment provides an output signal suitable for use in an anti-lock system on such a vehicle.

Examples of prior wheel speed sensing systems are shown in U.S. Pat. Nos. 3,854,556, 3,938,112, 3,961,215, 3,988,624 and 4,029,180, assigned to the assignee of the present invention. Typically such prior systems provide a ferromagnetic rotor rotatable with a vehicle wheel and a sensing device opposing the rotor across an air gap and fixed against rotation, as to an axle housing of the vehicle. The air gap may be axial or radial. The sensing device typically has been of electromagnetic type with an output signal of frequency proportional to the angular velocity of the rotor. In sensors of this general type, a long continuing problem has been presence of false information or noise in the output signal of the sensing device due to variations in the size of the air gap during operation, in turn due for example to rotor vibration or runout in the direction of the air gap. Such false information or noise in the output signal may cause production of improper lock signals in an anti-lock system.

Past attempts to overcome this problem have included, for example, manufacture of components to close tolerances or elaborate sensor mounting techniques. However, these approaches have been costly and unsatisfactory.

Another prior approach to the problem is disclosed in aforementioned U.S. Pat. No. 3,854,556 in which a pair of pole pieces which are not in simultaneous register with surface interruptions in the rotor are encircled by respective ones of a pair of corresponding coils connected to sum voltages induced by flux change caused by rotor rotation, but to subtract voltages induced by flux changes caused by rotor movement toward and away from the sensing device so that the latter voltages tend to cancel out. However, such prior structure is complicated and made more costly by requiring two separate coils.

Accordingly, the objects and purposes of this invention include provision of:

(1) A rotation sensing system including a wheel speed sensor of the type incorporating a sensing device opposed across an air gap to an annular rotor and wherein the output signal of the sensing device is substantially insensitive to the changes in the width of the air gap during operation.

(2) A system, as aforesaid, in which the sensing device requires only a single coil.

(3) A system, as aforesaid, in which the frequency of the output signal of the sensing device relies not exclusively on a change in amplitude of magnetic flux through the coil, but rather on a change in direction as well as such change in amplitude of magnetic flux through the coil, and wherein such changes in flux direction result from rotation of the rotor with respect to the sensing device but not from changes in the width of the air gap between the rotor and sensing device.

(4) A system, as aforesaid, in which the effect of variations in the width of such air gap during operation is merely to change the amplitude of flux through the coil.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a rotation sensor including an annular rotor rotatable, for example, with a wheel or the like, and having circumferentially distributed surface interruptions. A fixed sensing device faces the rotor and includes a source of magnetic flux and an adjacent coil for generating an electrical signal alternating with reversal of magnetic flux through the coil. The sensing device further includes first and second pole members coupled to opposite poles of the flux source and spaced so that one pole member opposes a surface interruption on the rotor while the other faces the rotor surface between surface interruptions, and vice versa, wherein rotation of the rotor provides a magnetic flux path which alternates between such first and second pole members. A third pole member has one end opposing the rotor and wider than the surface interruptions, and thus in continuous flux transferring relation with the rotor. The other end of the third pole member is coupled to a coil core extending through the inside diameter of the coil. The coil core is connected to a shunt which in turn is positioned to establish two predetermined air gaps between the first and second pole members, respectively. As the rotor rotates, the resulting flux in the coil core alternates in direction as the first and second pole members traverse the rotor spaces alternately.

BRIEF DESCRIPTION OF THE DRAWINGS

FIG. 1 is a fragmentary, partially broken side view of the rotation sensing system of this invention as applied to a wheel-axle assembly.

FIG. 2 is an enlarged pictorial view of the operating structure of the sensing device of FIG. 1.

FIG. 6 is a partly broken sectional view substantially as taken on the line VI—VI of FIG. 3.

FIG. 7 is a waveform diagram illustrating flux direction through the coil of the FIG. 1 sensing device under different conditions of operation.

FIG. 8 is a waveform diagram illustrating the effect of vibrational widening and narrowing of the air gap on the magnetic flux through the coil with the rotor in two different angular positions differing by about half the centerline distance between surface interruptions.

DETAILED DESCRIPTION

Figure 3:
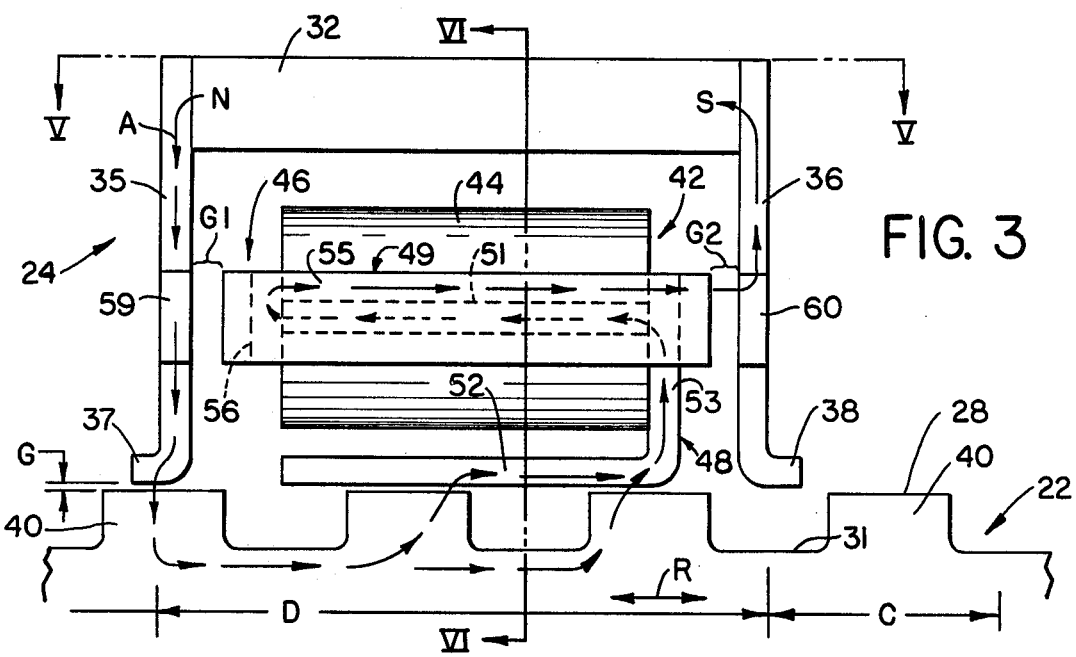
FIG. 3 is an enlarged fragmentary top view of the rotor and sensing device of FIG. 1 and corresponding substantially to the section line III—III of FIG. 1.

FIG. 1 illustrates an embodiment of the invention installed, by way of example, on a vehicle wheel-axle assembly 10 to provide a wheel speed signal. Assembly 10 comprises a wheel unit 12 rotatably supported by bearings 14 on a nonrotatable axle 11. Conventional brake mechanism, schematically indicated at 16, is mounted on a brake mounting flange 18 fixed to axle 11 and is conventionally actuable to brake rotation of the wheel unit 12. Wheel unit 12 conventionally incorporates a brake drum or disk, as well as suitable mounting means for a wheel.

A rotation indicating system 20 embodying the invention comprises an annular rotor 22 coaxially mounted for rotation with the wheel unit 12 and a sensing device 24 fixed with respect to the axle 11, e.g., on the flange 18, in sensing opposition to the rotor 22 across a primary air gap G. In the embodiment shown, the rotor and sensing device are opposed axially, but may be otherwise oriented, e.g. opposed radially, if desired and permitted by available space in the wheel-axle assembly.

Rotor 22 is formed as a ring of material capable of continuing a magnetic flux path, i.e., a ferromagnetic material such as steel. The rotor face 28 (FIG. 6) opposed to sensing device 24 comprises an evenly circumferentially spaced array of surface interruptions 29. In the embodiment shown, the rotor 22 is blocklike in cross section and surface interruptions 29 are grooves 31 cut deeply in rotor surface 28, leaving interspersed, toothlike rotor surface portions 40. However, rotor 22 and surface interruptions 29 may take other forms. For example, the surface interruptions may be apertures (e.g., holes or slots), teeth, or ripples formed in the rotor, or the rotor may be of metal sheet material. Rotor 22 may be fixed to wheel assembly 12 (FIG. 1) in any convenient manner, such as welding.

Sensing device 24 includes a source of magnetic flux, here a permanent bar magnet 32 (FIGS. 2, 3, 4, 5 and 6) extending substantially parallel to the surface interrupted face 28 of rotor 22. Ferromagnetic pole pieces 35 and 36 extend substantially in parallel, from the opposite magnetic polarity (here north and south respectively) ends of magnet 32 toward rotor face 28. The pole pieces are fixed to the ends of the magnet by any convenient means for providing a magnetic flux path between the magnet and rotor.

Pole pieces 35 and 36 end in flanges 37 and 38 adjacent to the rotor 22 which widen the pole piece surfaces opposed to the rotor. Flanged ends 37 and 38 do not however exceed the circumferential width of the grooves 31, or intervening teeth 40, of the rotor. Conveniently, such grooves and teeth are of similar circumferential width. The depth of aforementioned air gap G (FIG. 3) is measured between the tops of the teeth 40 (at rotor surface 28) and the opposed surface of the pole piece flanges 37 and 38.

The centers of the flanges 37 and 38 are spaced from each other by a distance:

$$D = (k + \tfrac{1}{2}) \times C,$$

wherein k is a convenient integer and C is the centerline distance between adjacent grooves 31. Restated, when one pole piece opposes a groove 31, the other pole piece opposes a tooth 40 and vice versa. In this way, one pole piece 35 or 36 will be in flux transmitting relation across air gap G with rotor 22 while the other is not, and vice versa. Thus, as the rotor 22 rotates, the pole pieces 35 and 36 alternate in completing a magnetic flux path between rotor 22 and magnet 32.

Sensing device 24 further comprises a common pole unit 42 incorporating a coil 44 and arranged to direct magnetic flux through the coil alternately in opposite directions as pole pieces 35 and 36 alternately oppose teeth 40 as the rotor 22 rotates. In the preferred embodiment shown, pole unit 42 further incorporates a magnetic flux carrying assembly 46 providing a continuous magnetic flux path therethrough and comprising a further pole piece 48, a shunt member 49 and an interconnecting core 51. Pole piece 48, shunt 49 and core 51 are of ferromagnetic material.

Core 51 extends coaxially the length of coil 44, which is preferably a simple coil wound on the core 51 for producing an electrical signal alternating in response to reversal of magnetic flux in core 51.

Pole piece 48 (FIGS. 2, 3 and 4) is here of L-shape with one leg 52 extending circumferentially along the face 28 of rotor 22 and spaced therefrom by gap G. Leg 52 has a length substantially similar to or exceeding the centerline spacing between two adjacent rotor teeth 40, so as to continuously oppose and substantially overlap at least one tooth 40 at all times during rotor rotation. Thus, pole piece 48 lies in constant flux transmitting relation with rotor 22. The other leg 53 of pole piece 48 extends away from rotor surface 28 and connects to the adjacent end of core 51.

Shunt 49 is here of modified T-shape, comprising a crossbar 55 spaced radially outward of coil 44 (here above such coil) and secured to the remaining end of core 51 by a radially extending leg 56, in magnetic flux transmitting relation therewith.

Shunt crossbar 55 is arranged to complete a magnetic flux loop alternately to one and then the other of the poles of magnet 32 as the rotor teeth 40 rotate alternately into flux transmitting relation with one and then the other of pole pieces 35 and 36. To provide this alternating flux transfer path between shunt crossbar 55 and the poles of magnet 32, each end of crossbar 55 is operatively associated with the adjacent pole of magnet 32, here through the intervening portion of the adjacent pole piece 35 or 36 and an intervening secondary air gap. More particularly, pole pieces 35 and 36 (FIGS. 3 and 5) have transverse extensions 59 and 60 with free ends opposed to the ends of shunt crossbar 55 across respective secondary air gaps G1 and G2. Because both ends of the crossbar 55 overhang the supporting leg 56, any flux transfer between the shunt 49 and extension 59 or 60 will be at G1 or G2 and not between supporting leg 56 and the opposed face of extension 59.

Figure 4:
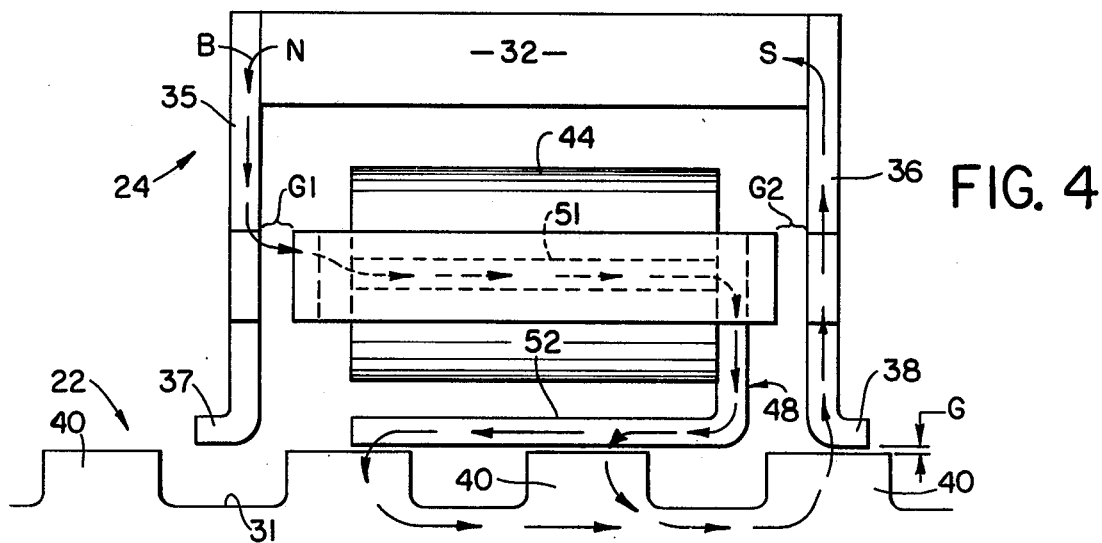
FIG. 4 is a view similar to FIG. 3 but with the rotor displaced circumferentially by one-half the centerline spacing between rotor surface interruptions.
Figure 5:
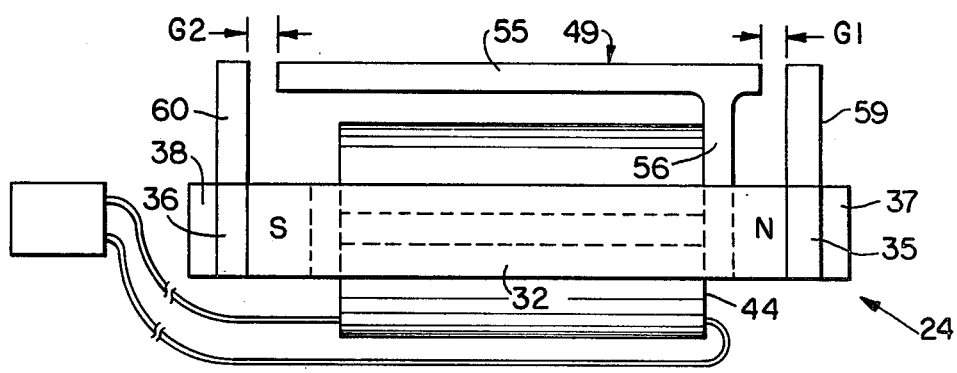
FIG. 5 is a sectional view taken substantially on the line V—V of FIG. 3.

Secondary gaps G1 and G2 are each substantially wider than primary gap G, but are substantially narrower than the space between a pole piece 35 or 36 and the bottom of an opposed rotor groove 31 (as with pole piece 36 in FIG. 3 and pole piece 35 in FIG. 4). Thus, for example, with the rotor positioned as in FIG. 3, there may be some leakage of N-pole flux from pole piece 35 across gap G1 to shunt crossbar 55, but the major and substantially greater transfer of N-pole flux is here instead across gap G, between the flanged end 37 of the pole piece 35 and rotor teeth 40.

OPERATION

The rotor 22, rotating in either direction as indicated by arrow R (FIG. 3), passes through its FIG. 3 position.

In that position, flux from the N pole of magnet 32 travels along a path indicated by the arrows A, namely from magnet pole N along pole piece 35 across primary gap G between flange 37 and opposed rotor tooth 40, circumferentially along rotor 22 and through the rotor tooth or teeth 40 opposed thereto, into leg 52 of further pole piece 48. No significant flux transfer takes place between pole piece flange 38 and rotor 22 since the former opposes a rotor groove 31 and is thus at its maximum spacing from the rotor. The magnetic flux in leg 52 passes through attached leg 53, leftward through core 51 within coil 44, then up leg 56 into crossbar 55. To complete the flux loop through the magnet 32, flux in the crossbar 55 is transferred rightwardly across secondary gap G2, down through pole piece extension 60, and the intervening portion of pole piece 36 to magnet pole S.

A rotation of one tooth (or groove) width takes rotor 22 from its FIG. 3 position to its FIG. 4 position, in which the end 37 of pole piece 35 now opposes a groove 31 rather than tooth 40 and hence is no longer in effective flux transferring relation with the rotor 22. Consequently, flux from pole N of magnet 32, passing through pole piece 35 as indicated by the arrows B, can escape only by transfer across the secondary gap G1 into the leftward end of crossbar 55 of shunt member 49, thereafter passing downward through support leg 56 into and rightward along the core 51 within the coil 44. Flux exiting from the rightward end of core 51 passes through the legs of further pole piece 48 and across the width of gap G into opposed rotor tooth 40. Such flux then proceeds through a further rotor tooth 40, across corresponding gap G, and along the length of pole piece 36 to complete the flux loop through the magnet 32 at magnet pole S.

For the substantial majority of flux to pass along paths A and B in FIGS. 3 and 4, respectively, while minimizing unwanted leakage, particularly across gap G1 in FIG. 3 and G2 in FIG. 4, the reluctance encountered at G1 of FIG. 3 (or gap G2 in FIG. 4) should substantially exceed the total reluctance encountered by the flux in crossing primary gaps at 37 and 52 in FIG. 3 (or at least 52 and 38 in FIG. 4). This may be accomplished by making the width across gap G1 (or gap G2) more than twice gap width G, and/or by making the effective cross-sectional area for flux passage at gap G1 (or gap G2) less than half the effective cross-sectional area for flux transfer at any of primary gaps G between the pole pieces of the sensing device and opposed teeth 40 of the rotor. Thus, in the embodiment shown, the rotor facing areas of leg 52 and flanges 37 and 38 are each large compared to the end faces of shunt crossbar 55 and, as mentioned, the primary gaps G are narrow compared to the secondary gaps G1 and G2.

Since the magnetic flux in core 51, and thus coil 44, reverses each time rotor rotation exchanges a tooth 40 for an adjacent groove 31 (or vice versa) opposite pole piece 35 (or 36), the voltage induced in the coil is of frequency corresponding to the rate of movement of rotor teeth past sensing device 24. The flux in the coil as the rotor 22 rotates past sensing device 24 is graphically represented by the solid line 66 in FIG. 7, and has both positive and negative (reversed) values.

Spurious movement of the rotor toward and away from the sensing device 24, to increase and reduce the gap G, as due to rotor vibration or runout, can raise or lower the flux amplitude in the coil but can not itself reverse the direction of the magnetic flux through the coil, since flux reversal within the coil requires rotor rotation. FIG. 8 shows an example of flux variation within the coil due to very rapid vibration of the rotor toward and away from the sensing device 24 with the rotor in its FIG. 3 circumferential position (at 68), and with the rotor in its FIG. 4 position (at 69). The length of the "time" axis in FIG. 8 is substantially less than a half cycle of the waveform in FIG. 7. At 68 and 69, the polarity of the flux depends on the rotational position of the rotor, and vibration of the rotor toward and away from the sensing device merely increases flux amplitude without reversing its direction.

The effect of a permanent, moderate increase in the width of gap G is illustrated in the broken line curve 70 in FIG. 7, which again indicates the fact that flux reversal in the core is a function of rotor rotation and is not a sensing of device-rotor separation.

Since the flux change in the core 51 resulting from motion of the rotor toward and away from the sensing device 24 is at maximum half the flux change caused by rotation of the rotor with respect to the sensing device, the maximum electrical signal generated by the coil, as a result of rotor movement toward and away from the sensing device, would at least theoretically be only one-half the coil electrical output signal amplitude due to rotor rotation.

Thus, the present invention provides for relatively high sensitivity to rotor rotational motion with only low sensitivity to rotor motion toward and away from the sensing device.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a rotation indication system for generating signals in response to relative rotation of two parts of a body, said system including:
   a rotor fixedly mountable on one of said body parts and having a plurality of surface interruptions circumferentially arranged thereon,
   sensing means fixedly mountable near said rotor on the other said body part for relative rotation between said rotor and sensing means in response to said relative rotation of said two body parts, the improvement wherein said sensing means comprises:
   a coil for generating an electrical signal variable with variations in the magnetic flux through said coil;
   first and second pole members opposed to the portion of said rotor having said surface interruptions;
   means for supplying magnetic flux through said pole members and rotor, in which said first and second pole members connect to opposite polarity portions of said magnetic flux supply means, one said pole member opposing a said surface interruption while the other said pole member opposes the rotor surface between said surface interruptions, and vice versa;
   flux transfer means for routing the magnetic flux along a path through said coil in one direction when the surface interruptions of the rotor are in a first angular position with respect to said pole members and through the coil in the opposite direction when said surface interruptions are in a second angular position which is advanced from said first position by a distance of approximately one-half the circumferential spacing between the centers of adjacent surface interruptions, said flux transfer means including a third pole member continuously opposing said rotor in a magnetic flux transferring relation which is substantially independent of the angular position of said surface interruptions, core means adjacent said coil for inducing an electric signal in said coil dependent on the direction of flux in said third pole member, and shunt means connected with said third pole member and core means, said shunt means lying adjacent opposite magnetic polarity portions of said magnetic flux supply means in magnetic flux transferring relation therewith.

2. In a rotation indication system for generating signals in response to relative rotation of two parts of a body, said system including:
   a rotor fixedly mountable on one of said body parts and having a plurality of surface interruptions circumferentially arranged thereon,
   sensing means fixedly mountable near said rotor on the other said body part for relative rotation between said rotor and sensing means in response to said relative rotation of said two body parts, the improvement wherein said sensing means comprises:
   a coil for generating an electrical signal variable with variations in the magnetic flux through said coil;
   first and second pole members opposed to the portion of said rotor having said surface interruptions;
   means for supplying magnetic flux through said pole members and rotor;
   flux transfer means for routing the magnetic flux along a path through said coil in one direction when the surface interruptions of the rotor are in a first angular position with respect to said pole members and through the coil in the opposite direction when said surface interruptions are in a second angular position which is advanced from said first position by a distance of approximately one-half the circumferential spacing between the centers of adjacent surface interruptions, in which said flux transfer means includes a third pole member, said first, second and third pole members each opposing said rotor across a first air gap, said first and second pole members being connected to opposite polarity portions of said magnetic flux supply means, said first and second pole members being located so that one opposes a said surface interruption while the other opposes a rotor surface portion between adjacent surface interruptions, and vice versa, said third pole member being wider than a said surface interruption to oppose at least one said rotor surface portion in all circumferential positions of said rotor;
   said flux transfer means also including shunt means connected to said third pole member and opposing said opposite polarity portions of said magnetic flux supply means across second air gaps for alternately transmitting flux across one said second gap and receiving flux across the other said second gap in response to rotation of said surface interruptions past said first and second pole members, respectively.

3. The system of claim 2 in which said magnetic flux supply means comprises a bar magnet extending substantially parallel to said rotor, said first and second pole members extending from opposite ends of said bar magnet substantially in parallel with and toward said rotor, said coil having an axis extending between said first and second pole members, said coil extending substantially parallel to said bar magnet and being disposed between said bar magnet and said rotor, said third pole member including a core extending through said coil and leg means connected to one end of said core and spaced between said coil and rotor in flux-transmitting relation therewith across a said first air gap, said shunt means comprising a leg extending substantially radially from the other end of said core and a crossbar connected to the free end of said leg and extending substantially lengthwise of said coil, said magnetic flux supply means further including portions extending from opposite polarity ends of said bar magnet and facing the ends of said crossbar across said second air gaps.

4. The system of claim 3 in which the reluctance of each said second air gap is less than the reluctance between either of said first and second pole members and a said surface interruption, but more than twice the reluctance between said pole member and an opposed rotor surface portion as located between adjacent surface interruptions.

* * * * *